(12) United States Patent
Tessarolo et al.

(10) Patent No.: US 10,359,995 B2
(45) Date of Patent: Jul. 23, 2019

(54) ARCHITECTURE AND INSTRUCTION SET TO SUPPORT INTEGER DIVISION

(71) Applicant: TEXAS INSTRUMENTS INCORPORATED, Dallas, TX (US)

(72) Inventors: Alexander Tessarolo, Lindfield (AU); Prasanth Viswanathan Pillai, Bangalore (IN); Venkatesh Natarajan, Bangalore (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 15/142,047

(22) Filed: Apr. 29, 2016

(65) Prior Publication Data
US 2017/0315779 A1 Nov. 2, 2017

(51) Int. Cl.
*G06F 7/535* (2006.01)
(52) U.S. Cl.
CPC .................................. *G06F 7/535* (2013.01)
(58) Field of Classification Search
None
See application file for complete search history.

(56) References Cited

U.S. PATENT DOCUMENTS

| | | | |
|---|---|---|---|
| 4,398,244 A | 8/1983 | Chu et al. | |
| 4,413,326 A | 11/1983 | Wilson et al. | |
| 4,777,613 A | 10/1988 | Shahan et al. | |
| 5,309,383 A | 5/1994 | Kuroiwa | |
| 5,404,324 A | 4/1995 | Colon-Bonet | |
| 6,061,781 A | 5/2000 | Jain et al. | |
| 6,782,405 B1 * | 8/2004 | Matula ............... | G06F 7/535 708/504 |
| 6,809,598 B1 | 10/2004 | Staszewski et al. | |
| 6,976,158 B2 | 12/2005 | Catherwood et al. | |
| 7,046,098 B2 | 5/2006 | Staszewski et al. | |
| 7,145,399 B2 | 12/2006 | Staszewski et al. | |
| 7,183,860 B2 | 2/2007 | Staszewski et al. | |
| 7,365,609 B2 | 4/2008 | Waheed et al. | |
| 7,532,679 B2 | 5/2009 | Staszewski et al. | |

(Continued)

OTHER PUBLICATIONS

J. Fandrianto, "Algorithm for High Speed Shared Radix 4 Division and Radix 4 Square-Root", Sunnyvale, CA, 1987 (7 pages).

(Continued)

*Primary Examiner* — Michael D. Yaary
(74) *Attorney, Agent, or Firm* — Brian D. Graham; Charles A. Brill; Frank D. Cimino

(57) ABSTRACT

A processor includes a core and a plurality of registers including a first register, a second register, and a third register. The core is configured to perform a division operation that includes execution of a sign extraction instruction in which a sign of at least one of a numerator value and a denominator value is stored, a conditional subtraction instruction which divides the numerator value by the denominator value to generate a quotient value and a remainder value, and a sign assignment instruction which adjusts the sign of at least one of the quotient and remainder values. The conditional subtraction instruction is configured to cause the core to perform multiple iterations of a conditional subtraction in one execution of the conditional subtraction instruction and in one clock cycle. Others methods and apparatus are described as well.

23 Claims, 3 Drawing Sheets

(56) References Cited

U.S. PATENT DOCUMENTS

| | | | |
|---|---|---|---|
| 7,570,182 B2 | 8/2009 | Sheba et al. | |
| 7,920,081 B2 | 4/2011 | Waheed et al. | |
| 8,045,670 B2 | 10/2011 | Waheed et al. | |
| 8,655,937 B1 * | 2/2014 | Vanderspek | G06F 7/535 |
| | | | 708/650 |
| 8,779,817 B2 | 7/2014 | Jakobsson | |
| 2003/0037088 A1 | 2/2003 | Gupte et al. | |
| 2008/0315928 A1 | 12/2008 | Waheed et al. | |
| 2009/0081984 A1 | 3/2009 | Gailus et al. | |
| 2011/0148676 A1 | 6/2011 | Waheed et al. | |
| 2012/0244824 A1 | 9/2012 | Entezari et al. | |
| 2013/0179664 A1 * | 7/2013 | Olson | G06F 9/3885 |
| | | | 712/215 |
| 2014/0091844 A1 | 4/2014 | Jakobsson | |
| 2015/0249455 A1 | 9/2015 | Burg et al. | |
| 2016/0182262 A1 | 6/2016 | Leistner et al. | |

OTHER PUBLICATIONS

Advanced Micro Devices Inc., "Am29331 16-bit Microprogram Sequencer", Publication #05729, Rev. E, 1987 (35 pages).

ARM, "ARM Cortex-M4 Processor Technical Reference Manual", Revision r0p1, Section 3.3.1, 2015 (7 pages).

Infineon Technologies, "C167CR Derivatives", User's Manual, V 3.1, Mar. 2000 (Year: 2000).

Infineon Technologies, "Instruction Set Manual for the C1666 Family of Infineon 16-Bit Single-Chip Microcontrollers", User's Manual, v 2.0, Mar. 2001 (Year: 2001).

* cited by examiner

ARCHITECTURE AND INSTRUCTION SET TO SUPPORT INTEGER DIVISION

BACKGROUND

Unsigned division on a computer involves an iterative process. Each iteration includes the execution of one conditional subtraction instruction and that instruction generally executes in one clock cycle. For an M-bit/N-bit integer division in a computer, the division process requires the execution of M conditional subtraction instructions which execute over M cycles. For example, a 32-bit integer division operation in a computer may require a conditional subtraction instruction to be executed 32 times and thus take 32 clock cycles to complete. Integer division thus is a relatively time-consuming operation.

BRIEF DESCRIPTION OF THE DRAWINGS

For a detailed description of various examples, reference will now be made to the accompanying drawings in which.

DETAILED DESCRIPTION

Figure 1:
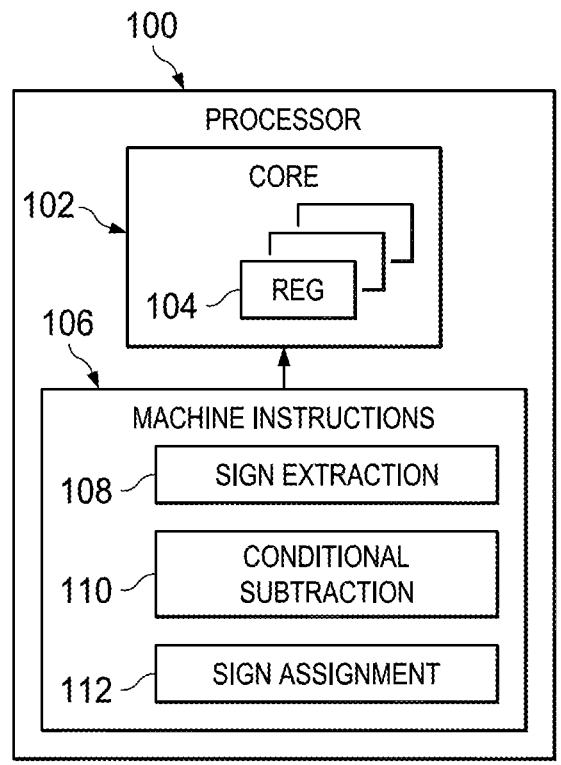
FIG. 1 shows a block diagram of a processor which can execute an instruction including sign extraction instructions, conditional subtraction instructions, and sign assignment instructions in accordance with various examples.

Certain terms are used throughout the following description and claims to refer to particular system components. As one skilled in the art will appreciate, different companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . " Also, the term "couple" or "couples" is intended to mean either an indirect or direct wired or wireless connection. Thus, if a first device couples to a second device, that connection may be through a direct connection or through an indirect connection via other devices and connections.

Many conventional integer processes involve the iterative execution of a conditional subtraction instruction—one such execution per cycle. In accordance with the disclosed embodiments, however, a conditional subtraction instruction is provided as part of an instruction set that performs multiple conditional subtraction operations in one execution of the instruction and thus in one cycle. The disclosed integer division process includes the use of an instruction set that includes sign extraction instructions, conditional subtraction instructions, and sign assignment instructions.

Various embodiments of the sign extraction instructions save the sign of the numerator for a signed numerator value as well as save the sign of the denominator value if the denominator is a signed value or otherwise computes the exclusive OR of the most significant bits of the numerator and denominator values. The sign extraction instructions also compute the absolute value of the numerator and denominator when such values are signed negative values.

After extracting the signs of the numerator and denominator and conversion of the numerator and denominator to unsigned integers as appropriate, one or more conditional subtraction instructions can be executed to perform an unsigned division. This instruction includes the performance of multiple conditional subtraction operations. For example, the conditional subtraction instruction may perform four conditional subtraction operations. As such, to divide a 32-bit numerator by a 32-bit denominator, eight executions of the conditional subtraction instruction are performed. Each execution of the instruction computes 4 bits of the quotient and thus the entire 32-bit quotient is computed after only eight executions of the instruction. Thus, the entire division process is much faster than if only a single conditional subtraction instruction was executed in each clock cycle.

The completion of the appropriate number of executions of the disclosed conditional subtraction instruction to fully consume all of the bits of the numerator results in the computation of the quotient and the remainder values. Following completion of the conditional subtraction process, the quotient and remainder may be adjusted as necessary depending on the signs of the numerator and denominator (as determined and extracted when executing the sign extraction instructions) and depending on the type of division desired. The disclosed instruction set supports truncated (also called traditional) division, modulo division, and Euclidean division. In some cases, the signs of the quotient and/or remainder are adjusted.

FIG. 1 shows a block diagram of a processor 100 in accordance with an embodiment. The processor 100 as shown includes a core 102, which contains multiple registers 104. The core 102 may contain other hardware components as well such as subtractors, comparators, fetch logic, decode logic, arithmetic logic units (ALUs), etc. The core 102 may execute various machine instructions 106, which may be stored in memory within, or otherwise accessible to, the core 102. The machine instructions 106 comprise an instruction set that includes instructions that may perform a variety of operations. One function that can be implemented through a series of instructions from the instruction set is integer division. In at least some embodiments, the integer division operation performed by processor 102 is implemented through the execution of a sign extraction instruction 108, one or more instances of a conditional subtraction instruction 110, and a sign assignment instruction 112. The machine instructions 106 may include one or more different types of sign extraction instructions 108, one or more different types of conditional subtraction instructions, and one or more different types of sign assignment instructions.

The integer division process that can be performed by the processor 100 includes the processor dividing a numerator (NUM) value by a denominator value (DEN). The result of the division is a quotient (QUO) and a remainder (REM). The division may include a signed NUM divided by a signed DEN, a signed NUM divided by an unsigned DEN, or an unsigned NUM divided by an unsigned DEN. Before executing a conditional subtraction instruction using the NUM and DEN, the state of the signs of the NUM and DEN are determined and saved through execution of a sign extraction instruction 108. Depending on the whether the NUM and DEN are signed or unsigned, the processor is programmed to execute a corresponding sign extraction instruction 108 and, if either of the NUM and DEN are negative values, the sign extraction instruction 108 also determines their absolute value. A conditional subtraction instruction can then be executed one or more times as needed based on the size of the NUM and DEN. Following the computation of the QUO and REM, an appropriate sign assignment instruction 112 is executed to restore the signs to the QUO and REM as may be necessary. While restoring the appropriate sign to the QUO and REM, the sign assignment instruction also may adjust the QUO and REM based on a specified type of division such as traditional, modulo, or Euclidean.

Figure 2:
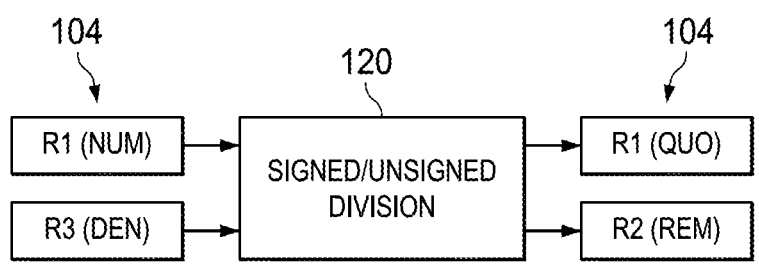
FIG. 2 illustrates the use of registers that include numerator and denominator values in a division operation that results in a remainder in a register and a quotient in the register originally including the numerator value in accordance with various examples.

FIG. 2 depicts the use of registers 104 to perform the integer division, which may be a signed or unsigned division process 120. NUM is stored in a register 104 designated in this example as R1 and DEN is stored in register R3. The completion of the division operation results in the quotient QUO and remainder REM being in registers R1 and R2, respectively. In this embodiment, the same register (R1) is used for both the NUM and the QUO. The register initially contains the NUM. The registers 104 may be implemented as shift registers. The NUM is consumed during the iterative division process one bit at a time starting with the most significant bit (MSB). Each iteration also results in the computation of a QUO bit. As the MSB of the NUM value is consumed, the bits of R1 are left-shifted one bit and the newly computed QUO bit is shifted into R1 at the least significant bit (LSB) location. The REM value is iteratively computed as well during the division process. Therefore, both the QUO and REM are computed and available when the last bit of the QUO is computed.

The integer division operation is an iterative process that consumes one NUM bit in each iteration to compute one QUO bit. Each iteration includes a conditional subtraction operation, which computes the difference between the left-shifted remainder appended with NUM MSB bit and the denominator if the number obtained as above is equal to or greater than the denominator in which case the quotient bit is determined to be a 1. If the number obtained as above is less than the denominator, no subtraction is performed and, instead, the quotient bit is determined to be a 0. In accordance with the disclosed embodiments, the conditional subtraction instruction 110 performs multiple (e.g., 4) conditional subtraction operations with one execution of the instruction and in one cycle.

Figure 3:
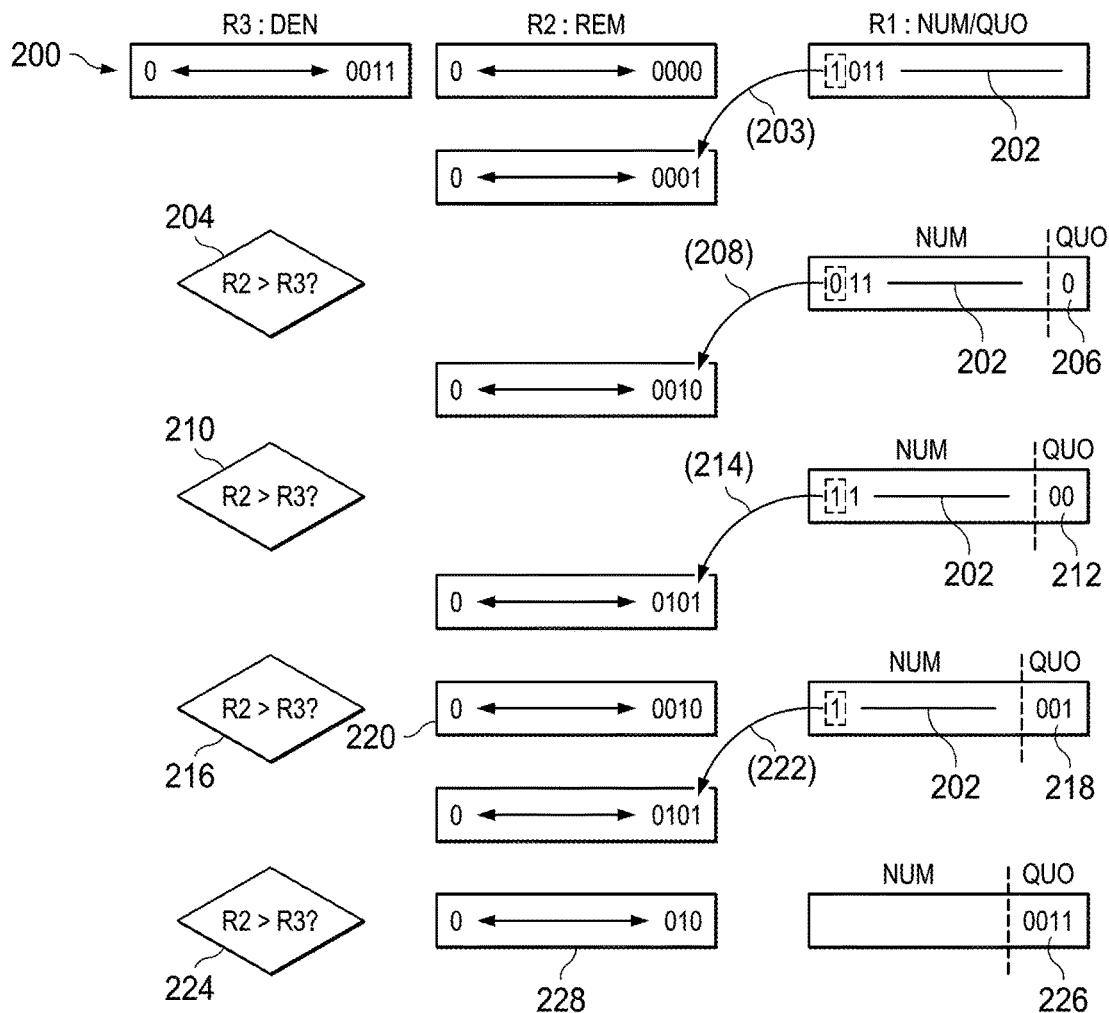
FIG. 3 illustrates a time sequence of events for computing four bits of a numerator during execution of a single conditional subtraction instruction in accordance with various examples.

FIG. 3 illustrates a time sequence of events to illustrate an execution of the disclosed conditional subtraction instruction, which performs four conditional subtraction operations. In other embodiments, the number of conditional subtraction operations may be other than four. In the example of FIG. 3, a numerator is to be divided by a denominator. The denominator in this example is decimal 3 (0011b in binary). The registers may be 32-bit registers (or other than 32 bits in other implementations). In the example of a 32-bit register, R3 contains the denominator [00 . . . 0011] as shown. The numerator also is a 32-bit value and, as explained above, is consumed four bits at time with each execution of the conditional subtraction instructions 110. The four numerator bits consumed during the execution of the conditional subtraction instruction are the four most significant bits. In the example of FIG. 3, the four most significant NUM bits are 1011b as shown in register R1. The remaining 28 least significant bits of NUM are depicted by the line 202 and will be consumed four bits at a time in subsequent executions of the conditional subtraction instruction 110.

At 200, the DEN value of 0011 is stored in register R3 and the NUM value containing 1011b as the MSBs is stored in register R1. A move instruction may be executed by the core 102 to place the NUM and DEN values in the corresponding registers R1 and R3. The remainder register R2 is initialized to a value of 0 as shown.

At 202, register R1 is left-shifted with the MSB bit (currently a "1") shifted into the LSB of the remainder register R2. At this point, the remainder register R2 is compared to the denominator register R3. If the denominator register R3 contains a value that is greater than the value in the remainder register R2, then the next QUO bit is determined to be 0. If the denominator register R3 contains a value that is less than or equal to the value in the remainder register R2, the QUO bit is determined to be a 1 and the difference between the values in remainder and denominator registers R2 and R3 is computed and the result written back to the remainder register R2. The process then repeats, three more times in this example.

In the example of FIG. 3, the remainder register R2 currently contains a value of 1b (after the MSB from R1 is shifted into the R2 at 202) and the denominator register R3 contains 0011b. R2 is compared to R3 at 204. The denominator register R3 (0011b) is greater than remainder register R2 (1b). As such, the next QUO bit is determined at 206 to be a 0 and is written into the LSB of register R1 as shown.

The process repeats and thus at 208, register R1 is again left-shifted with the MSB bit (currently a "0") of R1 is shifted into the LSB of the remainder register R2. The remainder register R2 now becomes 0010b. At 210, R2 is compared to R3. R2 contains 0010b and R3 contains the denominator 0011b. Thus, R2 is less than R3 and the next QUO bit is again determined to be a 0 and shifted into the LSB of R1 as illustrated at 212. As can be seen, the remaining MSBs of the numerator are shifted into the remainder register and consumed to compute QUO bits, which are shifted into the LSB positions of register R1. Thus, the NUM is iteratively shifted out of register R1 and the QUO is shifted into R1.

In the next iteration at 214, the register R1 is again left-shifted with the MSB (a 1) shifted into the LSB of the remainder register R2. R2 now contains the value 0101b. The remainder register R2 is compared to the denominator register R3 at 216. R2's value of 0101b is greater than R3's value of 0011b. Consequently, the next QUO bit is determined to be a 1 and is shifted into the LSB of register R1 at 218. In addition, the difference between R2 and R3 is determined as 0101b-0011b=0010b and the resulting difference 0010b is written into register R2 as shown at 220. At this point, the first three MSBs of the quotient have been determined to be 001b.

In the last iteration, register R1 is again left-shifted and the MSB (a 1) is shifted into the LSB of the remainder register R2 at 222. The remainder register R2 now contains the value 0101b and is compared to denominator register R3 (0011b). R2 is greater than R3 and thus the next QUO bit is determined to be a 1 as shown at 226. Further, the value contained in R3 (0011b) is subtracted from the value contained in R2 (0101b). The resulting difference 010b is written to the remainder register R2 as shown at 228.

At this point, the conditional subtraction instruction has performed four conditional subtraction operations. The four QUO bits were computed as 0011b and the REM is computed as 010b. The conditional subtraction instruction again may be executed with the current states of registers R1, R2 and R3 (from the previous iteration of the conditional subtraction instruction) used as the initial state of the registers for the new execution of the conditional subtraction instruction. The conditional subtraction instruction may be repeatedly executed until all 32 bits of register R1 have been consumed. At that point, register R1 will contain the entire quotient and register R2 will contain the remainder.

Figure 4:
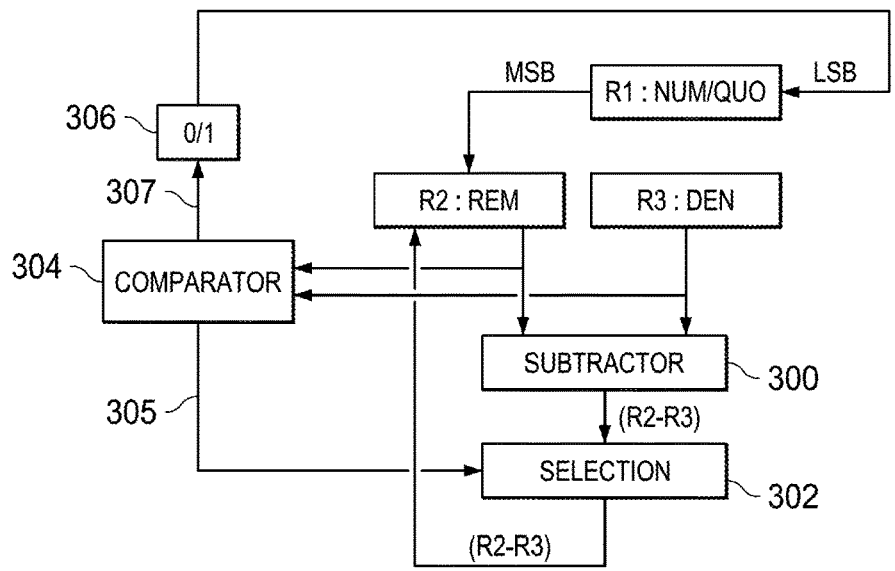
FIG. 4 shows a block diagram of a processor configured to execute the instruction set described herein in accordance with various examples.

FIG. 4 shows an example of an architecture for processor 100 to execute the conditional subtraction instruction 110. The illustrative architecture of FIG. 4 includes the R1, R2, and R3 registers (although additional registers may included), a subtractor 300, a selection circuit 302, a comparator 304, and a 0/1 bit generator 306. The components of the processor 100 may be comprised of transistors and other types of electrical circuit components. The subtractor 300 compares the values in the R2 remainder register and the R3 denominator register and generates an output as shown as R2-R3. The R2-R3 value is provided to the selection circuit 302.

The comparator 304 compares the values in the R2 and R3 registers and generates control signals 305 and 307 to the selection circuit 302 and the 0/1 bit generator 306, respectively. Although separate control signals 305, 307 are shown in FIG. 4, one control signal could be generated by the comparator 304 and provided to both the selection circuit 302 and the 0/1 bit generator 306. The comparator 304 determines whether the value in R2 is greater than or equal to the value in R3, or whether the value in R2 is less than the value in R3, and generates the control signals accordingly.

If R2 is greater than or equal to R3, then a control signal 305 is asserted to a first state that causes the selection circuit 302 to provide the R2-R3 value back to the register R2 for overwriting the value currently in R2. Thus, R2 will contain the value R2-R3. Further, when R2 is greater than or equal to R3, the comparator asserts control signal 307 to a first state to cause the 0/1 bit generator 306 to generate a 1 bit to be written into the least significant bit of register R1.

However, if the comparator determines that the value in R2 is less than the value in R3, the comparator asserts the control signal 305 to a second state to preclude the selection circuit 302 from outputting its R2-R3 computed value to the remainder register R2. As such, R2 remains unchanged. Further, when R2 is less than R3, the comparator asserts control signal 307 to a second state to cause the 0/1 bit generator 306 to generate a 0 bit to be written into the least significant bit of register R1.

Figure 5:
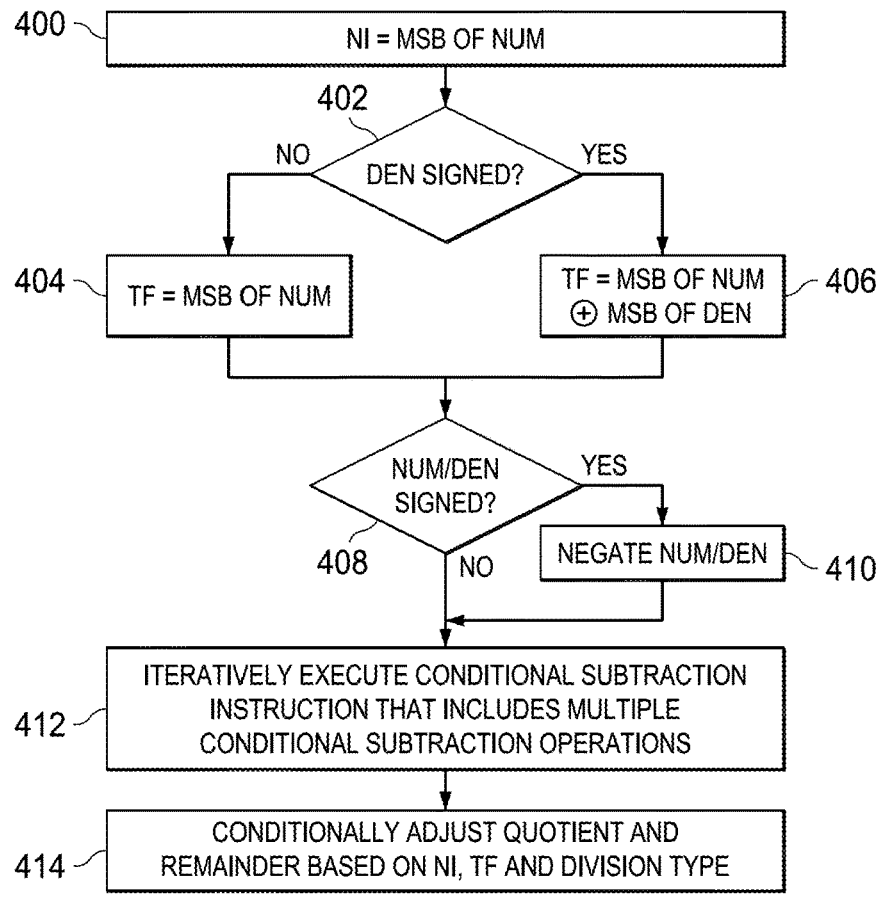
FIG. 5 shows a method for computing a signed division operation in accordance with various examples.

FIG. 5 is a flow chart depicting a method in accordance with various embodiments. The operations shown may be performed in the order presented in FIG. 5, or may be performed in a different order as desired. The method is performed by the processor 100 and specifically may be performed by the core 102 executing a sign extraction 108, one or more conditional subtraction instructions 110, and a sign assignment instruction 112. Generally, operations 400-410 are performed during the execution of a sign extraction instruction 108. Operation 412 is performed during the execution of one or more conditional subtraction instructions 110, and operation 414 is performed during execution of a sign assignment instruction 112. Through execution of different types of sign extraction instructions, conditional subtraction instruction, and sign assignment instructions, the disclosed embodiments can perform an integer division based on whether the numerator is a signed or unsigned value and whether the denominator is a signed or unsigned value. The illustrative method depicted in FIG. 5 covers multiple variations of dividing a numerator by a denominator (e.g., signed/signed, signed/unsigned). If the division is for a signed numerator and signed denominator, specific instructions are used for the sign extraction and assignment processes based on apriori knowledge of the numerator and denominator. Similarly, if the division involves a signed numerator and an unsigned denominator, different types of instructions are used for the sign extraction and assignment processes. If it is desired to divide an unsigned numerator by an unsigned denominator, the execution of a sign extraction instruction 108 and a sign assignment instruction 112 are not necessary.

At 400, the method includes initializing an "NI" flag to the MSB of the numerator. In some embodiments, the MSB of the numerator is the sign bit for numerators that are signed values. Setting the NI flag to the value of the numerator's MSB causes the sign (positive or negative) of the numerator to be saved.

If the denominator is a signed value (402), then control moves to operation 406. The sign extraction instruction itself does not make a determination as to whether the denominator is signed or unsigned. Whether the denominator is signed or unsigned is known apriori and a corresponding sign extraction is selected, for example, by a software programmer, compiler, etc. If the denominator is a signed number, then at 406 a "TF" flag is set to be the exclusive-OR between the MSBs of the numerator and denominator. Otherwise if the denominator is not a signed value, then at 408, the TF flag is set to be the MSB of the numerator. At this point, the state of the signed bits of the numerator and denominator have been saved and/or used to set the NI and TF flags.

If either NUM or DEN are signed and negative values (408), then the absolute value of each NUM and/or DEN is computed at 410. Any suitable technique for negating a negative NUM or DEN to a positive value can be used.

At 412, the method includes iteratively executing a conditional subtraction instruction that includes multiple conditional subtractions operations as described herein. In some embodiments, the conditional subtraction instruction performs four conditional subtractions in a single execution of the instruction and thus in one cycle, although other than four conditional subtractions can be implemented in other embodiments. The denominator is subtracted from the remainder and the difference replaces the value in the remainder register based on the remainder register currently containing a value that is greater than or equal to the denominator. Otherwise, the remainder register remains unchanged in that iteration. Further, in each such iteration, the QUO bit is determined to be a 1 if the remainder is greater than or equal to the denominator, or a 0 if the remainder is less than the denominator.

Following the completion of the unsigned division process of the numerator divided by the denominator, which may include multiple executions of the conditional subtraction instruction, at 414 the method includes (e.g., by the processor 100 executing a sign assignment instruction) conditionally adjusting the quotient and remainder based on the NI flag, the TF flag, and the type of division. The type of division may include traditional, modulo, and Euclidean. A separate sign assignment instructions can be executed for each division type. There is a sign assignment instruction for traditional division, a separate sign assignment instruction for modulo division, and a separate sign assignment instruction for Euclidean division. Such instructions are known and selected by a software programmer, compiler, etc. The various types of sign assignment instructions adjust the value of the QUO and REM such as by negating each such value, or by other forms of adjustment. The examples below illustrate various types of sign extraction and sign assignment instructions.

As explained above, multiple different sign extraction instructions 108 can be executed by the processor. Some examples of sign extraction instructions are provided below in Table I.

TABLE I

Sign Extraction Instructions

| Instruction | Microcode | Explanation |
| --- | --- | --- |
| ABSI32DIV32 R2H, R1H, R3H | NI = R1H(31)<br>TF = (R1H(31)) ^ (R3H(31))<br>if ((R1H = 0x8000_0000) \|<br>    (R3H = 0x8000_0000)) { LVF = 1}<br>R2H = 0<br>if (R1H(31) = 1) {R1H = −R1H}<br>if (R3H(31) = 1) {R3H = −R3H} | For a signed numerator and signed denominator. 32 bit division. MSB of R1 saved as NI Ex-OR of MSBs of R1 and R3 saved as TF. Overflow flag (LVF) is set if NUM or DEN is largest negative integer value. R2 initialized to 0. R1 and R3 negated if either is negative. R1 is negated if R1 is negative and same is the case with R3. |
| ABSI32DIV32U R2H, R1H, R3H | NI = R1H(31)<br>TF = R1H(31)<br>if (R1H = 0x8000_0000) { LVF = 1}<br>R2H = 0<br>if (R1H(31) = 1) {R1H = −R1H} | For a signed numerator and unsigned denominator. 32 bit division. MSB of NUM is saved as NI and TF, respectively. Overflow flag (LVF) is set if NUM is largest negative integer value. R2 initialized to 0. R1 negated if negative. |

Table II below provides several examples of conditional subtraction instructions in accordance with the disclosed embodiments.

TABLE II

Conditional Subtraction Instructions

| Instruction | Microcode | Explanation |
| --- | --- | --- |
| SUBC4UI32 R2H, R1H, R3H | ZI = 0<br>If (R3H = 0x0) {LVF = 1}<br>for(i=1;i<=4;i++) {<br>  temp(32:0) = (R2H << 1) +<br>  R1H(31) − R3H<br>  if(temp(32:0) >= 0)<br>    R2H = temp(31:0);<br>    R1H = (R1H << 1) + 1<br>  else<br>    R2H:R1H = (R2H:R1H) << 1<br>}<br>If (R2H = 0x0) {ZI = 1} | 32 bit unsigned div. Set LVF to 0 if DEN = 0. Perform 4 iterations in a loop. Each loop left shifts R2, R1's MSB is shifted into R2 and R2-R3 is computed as temp. If temp is >= 0, R1-R3 is stored in R2 and R1 is left shifted with 1 inserted into R1s LSB. Otherwise, R2/R1 is left shifted. ZI flag is set and used in Euclidean and modulo division. |

TABLE II-continued

Conditional Subtraction Instructions

| Instruction | Microcode | Explanation |
|---|---|---|
| SUBC2UI64 R2H:R4H, R1H:R0H, R3H:R5H | ZI = 0<br>If ((R3H:R5H) = 0x0) {LVF = 1}<br>for(i=1;i<=2;i++) {<br>  temp(64:0) = ((R2H:R4H) << 1) + R1H(31) − (R3H:R5H)<br>  if(temp(64:0) >= 0)<br>    (R2H:R4H) = temp(63:0);<br>    (R1H:R0H) = ((R1H:R0H) << 1) + 1<br>  else<br>  (R2H:R4H:R1H:R0H)=<br>  (R2H:R4H:R1H:R0H)<<1<br>}<br>If (R2H:R4H = 0x0) {ZI = 1} | Similar to SUBC4UI32, but 64 bit division. |

Table III below provides several examples of sign assignment instructions in accordance with the disclosed embodiments.

TABLE III

| Sign Assignment Instructions | | |
|---|---|---|
| NEGI32DIV32 R1H, R2H | if(TF = TRUE)<br>  R1H = −R1H<br>if(NI = TRUE)<br>  (R2H) = −(R2H) | For traditional division. QUO and REM are converted positive to negative conversion as needed as determined by states of TF and NI flags. |
| ENEGI32DIV32 R1H, R2H | IF (NI = 1 && ZI = 0) {<br>  R1H = R1H + 1<br>  R2H = R3H−R2H<br>}<br>if(TF = TRUE)<br>  R1H = −R1H | For Euclidean division. NUM = DEN*QUO + REM, 0 ≤ REM < |DEN|<br>Remainder will always be positive.<br>The case of (R1H = 0x7FFF_FFFF) will be caught by the overflow flag setting during ABS operation itself and hence not required. |
| MNEGI32DIV32 R1H, R2H | if (TF = 1 & ZI = 0) {<br>  R1H = R1H + 1<br>  R2H = R3H − R2H<br>}<br>if(TF = TRUE)<br>  R1H = −R1H<br>if(NI XOR TF = TRUE)<br>  (R2H) = −(R2H) | Sign manipulation for Modulo division.<br>REM = NUM − DEN*floor(NUM/DEN).<br>Remainder will follow sign of denominator |

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A processor, comprising:
   a core; and
   a plurality of registers including a first register, a second register, and a third register;
   wherein the core is configured to perform a division operation that includes a sign extraction instruction in which a sign of at least one of a numerator value and a denominator value is stored, a conditional subtraction instruction which divides the numerator value by the denominator value to generate a quotient value and a remainder value, and a sign assignment instruction which is configured to adjust the sign of at least one of the quotient and remainder values; and
   wherein the conditional subtraction instruction is configured to cause the core to perform multiple iterations of a conditional subtraction in one execution of the conditional subtraction instruction and in one clock cycle.

2. The processor of claim 1, wherein the first register is configured to include at least a portion of the numerator value, and wherein the conditional subtraction instruction is configured to iteratively compute bits of a quotient and shift each respective quotient bit into the first register.

3. The processor of claim 1, wherein the first register is configured to include at least a portion of the numerator value, and wherein the conditional subtraction instruction is configured to iteratively compute bits of a quotient and shift each respective quotient bit into the first register and shift a bit of the numerator value from the most significant bit of the first register into the second register.

4. The processor of claim 3, wherein the conditional subtraction instruction is configured to compare a value in the second register with the denominator value contained in the third register.

5. The processor of claim 4, wherein the core includes a subtractor that computes a difference between the values in the second and third registers and, based on a control signal from a comparator which compares the values in the second and third register, moves the difference into the second register.

6. The processor of claim 1, wherein the registers include the numerator value and the denominator value, at least one of the numerator and denominator values is a signed value, and wherein the sign extraction instruction is configured to cause the core to save the sign of the least one signed value and determine an absolute value of the least one signed value.

7. The processor of claim 6, wherein both of the numerator and denominator values are signed values, and wherein the sign extraction instruction is configured to cause the core to save the sign of the numerator and denominator values and determine the absolute value of both the numerator and denominator values.

8. The processor of claim 6, wherein the sign assignment instruction is configured to cause the core to negate at least one of a quotient value and a remainder value based on the saved sign value of the least one of the numerator and denominator values.

9. The processor of claim 6,
wherein the sign extraction instruction is configured to save the sign bit of the numerator value as a first variable and compute an exclusive OR of the sign bits of the numerator and denominator values and save the result of the exclusive OR as a second variable; and
wherein the sign assignment instruction is configured to cause the core to negate a quotient value based on the first variable and to negate a remainder value based on the second variable.

10. A processor, comprising:
a core; and
a plurality of registers including a first register, a second register, and a third register;
wherein the core is configured to execute an instruction set which includes a plurality of sign extraction instructions, a conditional subtraction instruction which divides a numerator value by a denominator value to generate a quotient value and a remainder value, and a plurality of sign assignment instructions;
wherein a first sign extraction instruction is for a signed numerator and a signed denominator and is configured to save the sign of the numerator to a first flag, compute the exclusive-OR of the most significant bits of the numerator and denominator, and, for a negative numerator, negate the numerator and for a negative denominator negate the denominator; and
wherein a first sign assignment instruction adjusts the quotient and remainder values consistent with traditional division, a second sign assignment instruction adjusts the quotient and remainder values consistent with modulo division, and a third sign assignment instruction adjusts the quotient and remainder values consistent with Euclidean division.

11. The processor of claim 10, wherein the plurality of sign extraction instructions includes a second sign extraction that is for a second signed numerator and an unsigned denominator and is configured to save the signs of the second numerator and the unsigned denominator and, for a negative numerator, negate the second numerator.

12. The processor of claim 10, wherein the conditional subtraction instruction is configured to cause the core to perform multiple iterations of a conditional subtraction in one execution of the conditional subtraction instruction.

13. The processor of claim 10, wherein the first register is configured to include at least a portion of the numerator value, and wherein the conditional subtraction instruction is configured to iteratively compute bits of a quotient and shift each respective quotient bit into the first register.

14. The processor of claim 10, wherein the core includes a subtractor that computes a difference between the values in the second and third registers and, based on a control signal from a comparator, which compares the values in the second and third register, moves the difference into the second register.

15. A method implemented on a processor, comprising:
saving to a first flag a sign bit of a numerator contained in a first register;
initializing a second register to 0;
setting a second flag based in part on a sign bit of a denominator contained in a third register;
for a negative numerator, negating the numerator in the first register;
iteratively executing a conditional subtraction instruction that includes multiple conditional subtraction operations to generate a quotient in the first register and a remainder in the second register; and
conditionally adjusting the quotient in the first register and the remainder in the second register based on the first and second flags and based on a division type encoded in a sign assignment instruction.

16. The method of claim 15, wherein during each execution of the conditional subtraction instruction, computing a plurality of bits of the quotient and shifting each respective quotient bit into the first register.

17. The method of claim 15, further comprising for a negative denominator, negating the denominator in the third register.

18. The method of claim 15, wherein the division type includes at least one of traditional division, modulo division, and Euclidean division.

19. The method of claim 15, wherein setting the second flag includes, for an unsigned denominator, saving the sign bit of the numerator to the second flag.

20. The method of claim 15, wherein setting the second flag includes computing the exclusive-OR of the most significant bits of the numerator and denominator to produce an exclusive-OR result and setting the second flag to the exclusive-OR result.

21. A processor, comprising:
a core; and
a plurality of registers including a first register, a second register, and a third register;
wherein the core is configured to execute a conditional subtraction instruction on a numerator value and a denominator value to generate at least a portion of a quotient; and
wherein the conditional subtraction instruction is configured to cause the core to perform multiple iterations of a conditional subtraction process in one execution of the conditional subtraction instruction and in one clock cycle.

22. The processor of claim 21, wherein the core is configured to execute a sign extraction instruction which is for a signed numerator and a signed denominator and is configured to save the sign of the numerator to a first flag, compute the exclusive-OR of the most significant bits of the signed numerator and signed denominator, and, for a negative numerator, negate the signed numerator and for a negative denominator negate the denominator.

23. The processor of claim 21, wherein the core is configured to execute a plurality of sign assignment instructions including a first sign assignment instruction configured to adjust at least one the quotient and a remainder consistent with traditional division, a second sign assignment instruction configured to adjust the quotient and remainder values consistent with modulo division, and a third sign assignment instruction configured to adjust the quotient and remainder values consistent with Euclidean division.

* * * * *